United States Patent

Hasegawa et al.

[11] Patent Number: 5,550,190
[45] Date of Patent: Aug. 27, 1996

[54] THERMOPLASTIC ELASTOMER COMPOSITION

[75] Inventors: Ko Hasegawa; Toshio Teramoto, both of Yokkaichi; Tatsuo Nakajima, Iwata; Takeyoshi Konomoto, Kakegawa, all of Japan

[73] Assignees: Japan Synthetic Rubber Co., Ltd., Tokyo; NTN Corporation, Osaka, both of Japan

[21] Appl. No.: 858,656

[22] Filed: Mar. 27, 1992

[30] Foreign Application Priority Data

Mar. 27, 1991 [JP] Japan ..................... 3-087928

[51] Int. Cl.$^6$ ..................... C08L 67/02
[52] U.S. Cl. ............ 525/92 A; 525/89; 525/92 F; 525/173; 525/175; 525/176; 525/177; 525/408; 525/446
[58] Field of Search .................. 525/92, 173, 175, 525/89, 176, 177, 408, 446

[56] References Cited

U.S. PATENT DOCUMENTS

| 3,963,802 | 6/1976 | Shih. | |
|---|---|---|---|
| 4,124,653 | 11/1978 | Whitlock. | |
| 4,141,863 | 2/1979 | Coran et al. | |
| 4,290,927 | 9/1981 | Tanaka et al. | |
| 4,367,316 | 1/1983 | Tanaka et al. | |
| 4,629,761 | 12/1986 | Wolfe | 525/92 |
| 4,843,124 | 6/1989 | Wolfe | 525/92 |
| 4,981,908 | 1/1991 | Wolfe | 525/92 |

FOREIGN PATENT DOCUMENTS

| 0327010 | 8/1989 | European Pat. Off. . |
| 52-138546 | 11/1977 | Japan . |
| 53-8652 | 1/1978 | Japan . |
| 62-218444 | 9/1987 | Japan . |
| 655940 | 5/1986 | Switzerland . |
| 2122627 | 1/1984 | United Kingdom . |

*Primary Examiner*—Patricia A. Short
*Attorney, Agent, or Firm*—Oblon, Spivak, McClelland, Maier & Neustadt, P.C.

[57] ABSTRACT

The composition of the present invention is a thermoplastic elastomer composition obtained by dynamically crosslinking (A) 51–95% by weight of a thermoplastic polyester elastomer and (B) 49–5% by weight of a rubber during kneading. The composition is excellent in all of hardness, tensile strength, tensile elongation, compression set, thermal aging resistance, oil resistance and molded product appearance, and is suitably used as a material for automobile parts such as joint boot and the like.

19 Claims, No Drawings

THERMOPLASTIC ELASTOMER COMPOSITION

The present invention relates to a thermoplastic polyester elastomer-based composition which is improved in flexibility and compression set while retaining the excellent heat resistance and oil resistance inherently possessed by thermoplastic polyester elastomers.

Thermoplastic polyester elastomers are multi-block copolymers having, in the polymer main chain, polyester- and polyether-recurring units or polyester- and polyester-recurring units, and are excellent in mechanical properties, heat resistance and oil resistance. While having excellent properties as above, said polyester elastomers have drawbacks of high hardness, poor flexibility and large compression set, and their use in wider applications has been restricted. For remedying the above drawbacks to obtain a flexible material, there were proposed a method in which a polyester elastomer is compounded with a polystyrene type block copolymer to flexibilize the former (Japanese Patent Application Kokai No. 50-82162) and a method in which a polyester elastomer is compounded with an ethylene copolymer to flexibilize the former (U.S. Pat. No. 3,963,802). The polyester elastomers obtained by these methods, however, have such drawbacks that the flexibility is not fully sufficient and that the resulting composition has reduced oil resistance. There was also proposed a method which comprises compounding a polyester elastomer with a vulcanizable rubber and, in the same manner as in conventional rubbers, conducting, on rubber rolls, addition of a crosslinking agent and subsequent vulcanization of the rubber to allow the composition to have all of flexibility, oil resistance and heat resistance (Japanese Patent Application Kokai No. 52-138, 546). The method, however, has such a drawback that since the crosslinking agent is added at a temperature significantly lower than the melting point of the polyester elastomer, the crosslinking agent is not sufficiently dispersed during kneading and it is difficult to obtain a stable composition in actual production. Moreover, the composition obtained is not sufficient in oil resistance and heat resistance.

The thermoplastic polyester elastomers are suitable for use as a material for automobile parts (joint boot, in particular). With conventional thermoplastic polyester elastomers, however, it has been impossible to produce a joint boot having stable durability (life); the joint boot obtained has had insufficient flexibility, so that the workability is very low.

Thus, the polyester elastomers are excellent in mechanical properties, oil resistance, heat resistance, etc. and their use in wider applications is desired, but they have a drawback of poor flexibility.

The present inventors have made extensive research in order to solve the above-mentioned problems and found that the problems can be solved by subjecting a thermoplastic polyester elastomer and a rubber to dynamic crosslinking.

According to the present invention, there is provided a thermoplastic elastomer composition obtained by dynamically crosslinking (A) 51–95% by weight of a thermoplastic polyester elastomer and (B) 49–5% by weight of a rubber during kneading.

The thermoplastic polyester elastomer (A) is a polyester block copolymer and has, in the polymer chain, (A-1) a high-melting crystalline segment composed mainly of an aromatic polyester unit and (A-2) a low-melting polymer segment composed mainly of an aliphatic polyether unit and/or an aliphatic polyester unit.

The aromatic polyester unit in the high-melting crystalline segment (A-1) (which is a hard segment) is derived from an acid component and a glycol component. The acid component is substantially terephthalic acid and/or 2,6-naphthalenedicarboxylic acid. As the acid component, there may be used, in combination with terephthalic acid and/or 2,6-naphthalenedicarboxylic acid, a small amount of other aromatic dicarboxylic acid (e.g. isophthalic acid) or an aliphatic dicarboxylic acid (e.g. adipic acid, sebacic acid, cyclohexane-1,4-dicarboxylic acid, dimer acid).

The glycol component constituting the aromatic polyester unit is a glycol of 2–12 carbon atoms, such as ethylene glycol, propylene glycol, tetramethylene glycol, neopentyl glycol, hexanediol, decanediol or the like.

The lower limit of the melting point of the high-melting crystalline segment (A-1) is generally 150° C. or more, preferably 170° C., more preferably 190° C. or more.

The aliphatic polyether unit in the low-melting polymer segment (A-2) (which is a soft segment) is derived from a polyalkylene glycol. The polyalkylene glycol is, for example, polyethylene glycol, polypropylene glycol, polytetramethylene glycol or polyethylene glycol-polypropylene glycol block copolymer. Of these, polytetramethylene glycol is particularly preferable.

These glycols have a carbon atom number:oxygen atom number ratio of 2 to 4.5, and can be used alone or in admixture.

The aliphatic polyester unit, which is another unit in the low-melting polymer segment (A-2), is derived from an aliphatic dicarboxylic acid as a main acid component and a glycol. The aliphatic dicarboxylic acid as a main acid component is, for example, succinic acid, adipic acid, sebacic acid or decanedicarboxylic acid. The aliphatic dicarboxylic acid may be used in combination with a small amount of an aromatic dicarboxylic acid (e.g. isophthalic acid).

The glycol component constituting the aliphatic polyester unit is a glycol of 2–12 carbon atoms. Its specific examples are the same as those mentioned for the glycol component constituting the aromatic polyester unit of the high-melting crystalline segment (A-1).

The aliphatic polyester unit is obtained by polycondensing the above aliphatic dicarboxylic acid and the above glycol by an ordinary process. It may be a homopolyester, a copolyester, or a polylactone (e.g. a poly-ε-caprolactone) obtained by subjecting a cyclic lactone to ring-opening polymerization. The upper limit of the melting point of the aliphatic polyester unit is not critical, though it is preferably 130° C. or less, particularly preferably 100° C. or less.

The molecular weight of the low-melting polymer segment (A-2) is usually 400–6,000.

The weight ratio of the high-melting crystalline segment (A-1) to the low-melting polymer segment (A-2) in the thermoplastic polyester elastomer (A) is preferably 95/5 - 5/95, more preferably 70/30 - 30/70.

As the thermoplastic polyester elastomer (A), an elastomer having a softening point of 100° C. or more is particularly appropriate.

The polyester block copolymer which is used particularly preferably as the thermoplastic polyester elastomer (A), is derived from a polytetramethylene terephthalate or a polytrimethylene terephthalate-2,6-naphthalate as the high-melting crystalline segment (A-1) and an aliphatic polyether such as polytetramethylene glycol or the like or an aliphatic polyester such as polytetramethylene adipate, poly-ε-caprolactone or the like as the low-melting polymer segment (A-2). The polyester block copolymer may contain, as part of the dicarboxylic acid and the glycol, polyfunctional components such as polycarboxylic acid, polyfunctional hydroxy compound, hydroxy acid and the like. The polyfunctional components are used in the copolymer in amounts of 3 mole % or less and exhibit a high thickening effect. The polyfunctional components include, for example, trimetallitic acid, trimesic acid, pyromellitic acid, benzophenonetetracarboxylic acid, butanetetracarboxylic acid, glycerine, pentaerythritol, and their esters and anhydrides.

The thermoplastic polyester elastomer (A) can be produced by an ordinary polymerization process. Preferable processes include a process which comprises heating an aromatic dicarboxylic acid or a dimethyl ester thereof and a low-melting segment-formable diol at about 150°–260° C. in the presence of a catalyst to subject them to esterification reaction or ester exchange reaction and then subjecting the reaction product to polycondensation reaction under vacuum while removing the excessive low-molecular diol to obtain a thermoplastic elastomer; a process which comprises a high-melting polyester segment-formable prepolymer and a low-melting polymer segment-formable prepolymer both prepared in advance, with a bifunctional chain extender reactive with the terminal groups of the prepolymers, subjecting the prepolymers and the chain extender to reaction, and keeping the system under high vacuum to remove volatile components to obtain a thermoplastic polyester elastomer; a process which comprises heat-mixing a high-melting polyester of high polymerization degree with a lactone with heating to subject them to ring-opening polymerization of lactone and ester exchange reaction simultaneously to obtain a thermoplastic polyester elastomer; and processes similar thereto.

The rubber which is the component (B) of the present invention, includes halogen-free diene rubbers, hydrogenation products of halogen-free diene rubbers, acrylic rubbers, epichlorohydrin rubbers, olefin rubbers, halogen-containing rubbers, silicone rubbers, etc.

The halogen-free diene rubbers include, for example, natural rubber, a polyisoprene rubber, a styrene-butadiene copolymer rubber, a styrene-butadiene block copolymer rubber, a polybutadiene rubber, an acrylonitrile-butadiene copolymer rubber and acrylic acid ester-butadiene copolymer rubbers.

The hydrogenation products of halogen-free diene rubbers include, for example, hydrogenated polybutadiene, hydrogenated polyisoprene, hydrogenated styrene-butadiene copolymer rubber, hydrogenated styrene-butadiene block copolymer rubber, hydrogenated acrylic acid ester-butadiene copolymer rubber and hydrogenated acrylonitrile-butadiene copolymer rubber.

The hydrogenated styrene-butadiene block copolymer rubber includes, for example, (b-1) a hydrogenated diene copolymer (referred to hereinafter as "hydrogenated polymer b-1") having a polystyrene-reduced number-average molecular weight of 50,000–600,000, obtained by hydrogenating a (P)-(Q) or (P)-(Q)-(P) block copolymer consisting of a vinyl aromatic compound polymer block (P) and a random copolymer block (Q) consisting of an alkenyl aromatic compound and a conjugated diene, or a (P)-(Q)-(R) block copolymer consisting of the block (P), the block (Q) and a tapered block (R) consisting of an alkenyl aromatic compound and a conjugated diene in which block (R) the proportion of alkenyl aromatic compound increases gradually (the two block copolymers are referred to hereinafter as "polymer b-1"), in which hydrogenated polymer b-1 at least 80% of the double bonds of the conjugated diene portions is saturated with hydrogen, (b-2) a hydrogenated diene copolymer (referred to hereinafter as "hydrogenated polymer b-2") having a polystyrene-reduced number-average molecular weight of 40,000–700,000, obtained by hydrogenating a (P)-(S)-(T) block copolymer (referred to hereinafter as "polymer b-2") consisting of the block (P), a block (S) which is a conjugated diene polymer block or an alkenyl aromatic compound-conjugated diene copolymer block and in which the content of 1,2-vinyl configuration is 25–95%, and a conjugated diene polymer block (T) in which the content of 1,2-vinyl configuration is 20% or less, in which hydrogenated polymer b-2 at least 80% of the double bonds of the conjugated diene portions is saturated with hydrogen, and (b-3) a hydrogenated diene copolymer (referred to hereinafter as "hydrogenated polymer b-3") having a polystyrene-reduced number-average molecular weight of 50,000–600,000, obtained by hydrogenating a block copolymer (referred to hereinafter as "polymer b-3") consisting of the block (S) and the block (T) and represented by (T)-(S)-(T) or [(T)-(S)]$_m$ (m is 2 or more), in which hydrogenated polymer b-3 at least 90% of the double bonds of the conjugated diene portions are saturated with hydrogen.

The above aromatic alkenyl compound includes styrene, α-methylstyrene, tert-butylstyrene, p-methylstyrene, divinylbenzene, 1,1-diphenylstyrene, N,N-diethyl-p-aminoester-styrene, vinylpyridine, etc. Of these, styrene and α-methylstyrene are particularly preferable.

The conjugated diene includes 1,3-butadiene, isoprene, 2,3-dimethyl-1,3-butadiene, 1,3-pentadiene, 1,3-hexadiene, 4,5-diethyl-1,3-octadiene, 3-butyl-1,3-octadiene, chloroprene, etc. Of these, 1,3-butadiene, isoprene and 1,3-pentadiene are preferable, and 1,3-butadiene is particularly preferable.

In the polymer b-1, the alkenyl aromatic compound/conjugated diene weight ratio is preferably 5–60/95–40, more preferably 5–40/95–60.

In the block (P) and the optional block (R), the total of the bound alkenyl aromatic compound content is preferably 3–50% by weight, more preferably 3–25% by weight based on the total monomers. In the block (Q), the content of 1,2-vinyl configuration is preferably 15% or more, more preferably 30% or more.

The hydrogenation degree of the polymer b-1 is 80% by weight or more, preferably 90% by weight of more.

The polystyrene-reduced number-average molecular weight of the hydrogenated polymer b-1 is preferably 50,000–600,000, more preferably 70,000–250,000.

In the polymer b-2, the content of the block (P) is preferably 10–50% by weight, more preferably 15–45% by weight; the content of the block (S) is preferably 30–80% by weight, more preferably 35–70% by weight; and the content of the block (T) is preferably 5–30% by weight, more preferably 5–25% by weight.

In the block (S), the content of 1,2-vinyl configuration is preferably 25–95%, more preferably 30–60%. In the block (T), the content of 1,2-vinyl configuration is preferably 20% or less, more preferably 5–15%.

The hydrogenation degree of the polymer b-2 is preferably 80% or more, more preferably 90% or more. The polystyrene-reduced number-average molecular weight of the hydrogenated polymer b-2 is preferably 40,000–700,000, more preferably 60,000–400,000.

In the polymer b-3, the content of the block (S) is preferably 10–95% by weight, more preferably 15–90% by weight, and the content of the block (T) is preferably 5–90% by weight, more preferably 10–85% by weight.

The contents of 1,2-vinyl configuration in the block (S) and the block (T) are the same as those in the polymer b-2.

The hydrogenation degree of the polymer b-3 is preferably 90% or more, more preferably 95% or more. The polystyrene-reduced number-average molecular weight of the hydrogenated polymer b-3 is preferably 50,000–600,000, more preferably 100,000–400,000.

The polymers b-1 to b-3 may be subjected to coupling with a coupling agent, and hence include, for example, those represented by $[(P)-(Q)]_n-X$, $[(P)-(Q)-(R)]_n-X$, $[(P)-(Q)-(P)]_n-X$, $[(P)-(S)-(T)]_n-X$ and $[(T)-(S)-(T)]_n-X$ wherein n represents 2–4 and X represents a coupling agent residue.

The hydrogenated acrylic acid ester-butadiene copolymer rubber referred to above is a random copolymer rubber consisting of an alkyl acrylate or an alkoxy-substituted alkyl acrylate and a conjugated diene, in which rubber at least 90% of the double bonds of polymerized conjugated diene units are hydrogenated, and is described in detail in Japanese Patent Application Kokai No. 2-218704.

The acrylic rubber includes, for example, acrylic acid-ethyl acrylate copolymer rubber and the like.

The olefin rubbers include, for example, an ethylene-propylene copolymer and ethylene-propylenediene terpolymer rubbers.

The epichlorohydrin rubbers include epichlorohydrin homopolymer rubber and epichlorohydrin-ethylene oxide copolymer rubber.

The halogen-containing rubbers include chloroprene rubber, chlorinated polyethylene rubber, chlorosulfonated polyethylene rubber, chlorinated butyl rubber, brominated butyl rubber, chlorinated ethylenepropylene rubber, etc.

The silicone rubbers used in the present invention include dimethylpolysiloxane, methylvinylpolysiloxane, methylphenylvinylpolysiloxane, trifluoropropylemthylvinylpolysiloxane, methylphenylsilicone and the like.

Besides the above, there can likewise be used those synthetic rubbers whose popular names are polysulfide rubber, chlorophosphazene rubber, urethane rubber, ethylene-vinyl acetate copolymer rubber, polyethylene oxide rubber, silicone rubber, fluororubber and the like.

In the present invention, the rubber (B) is preferably a halogen-free diene rubber, a hydrogenation product of a halogen-free diene rubber or an epichlorohydrin rubber.

Preferable specific examples of the rubber (B) include acrylonitrile-butadiene copolymer rubber, hydrogenated acrylonitrile-butadiene copolymer rubber, hydrogenated acrylic acid ester-butadiene copolymer rubber and ethylene-propylene copolymer rubber.

The rubber (B), when a functional group such as carboxyl group, epoxy group, amino group or the like is introduced thereinto, can have higher compatibility with the thermoplastic polyester elastomer (A), whereby the resulting thermoplastic elastomer composition can have improved mechanical strengths and compression set.

The introduction of a functional group into the rubber (B) is conducted by copolymerizing acrylic acid, methacrylic acid, itaconic acid, maleic acid, glycidyl (meth)acrylate, an alkyl amino(meth)acrylate or the like with the other components constituting the rubber (B).

The introduction of such a functional group can be conducted before the kneading of the components (A) and (B) or concurrently with the kneading of the components (A) and (B).

In the present invention, the solubility parameter value of the rubber (B) is preferably 8.0 or more, more preferably 8.5 or more, most preferably 9.0 or more.

For the solubility parameter of rubber, there can be utilized the values described in literature references such as "Rubber Industry Handbook" and "Guide to Rubber Techniques (Revised Edition)" both published by The Society of Rubber Industry, Japan. For rubbers not known in any literature, their solubility parameters can be measured by the various methods described in "Solvent Handbook" published by Kodansha Limited, Publisher. Herein, as the solubility parameters of rubbers not known in any literature, there are used, as approximate values, values obtained by a simple method proposed by Small, in which a solubility parameter of a substance is calculated from the molecular cohesion energy constant of the substance.

In the present invention, the gel content of the rubber (B) is preferably 50% by weight or more, more preferably 70% by weight or more.

The gel content is determined by dissolving the rubber after crosslinking, in a solvent capable of sufficiently dissolving the rubber before crosslinking, for example, toluene or methyl ethyl ketone and measuring the proportion of the insolubles to the rubber after crosslinking.

In the composition of the present invention, the amount of the thermoplastic polyester elastomer (A) used is 51–95% by weight, preferably 55–85% by weight, and the amount of the rubber (B) used is 49–5% by weight, preferably 45–15% by weight.

When the amount of the thermoplastic polyester elastomer (A) is more than 95% by weight, the resulting composition has no sufficient improvement effect on flexibility and compression set. When the amount is less than 51% by weight, the resulting composition has poor processability and fluidity.

In obtaining the composition of the present invention, the thermoplastic polyester elastomer (A) and the rubber (B) are not simply blended but are subjected to dynamic crosslinking in order to impart to the composition much better properties which are not obtained by simple blending. The dynamic crosslinking refers to a technique developed by W. M. Fischer et al. of Uniroyal Co. and A. Y. Coran of Monsanto Co. which comprises mixing a rubber with a thermoplastic resin as a matrix, kneading the mixture with a crosslinking agent to subject the rubber to high degree of crosslinking and disperse the rubber finely in the matrix.

As the crosslinking agent usable in the dynamic crosslinking, there can be used peroxides, resin crosslinking agents, sulfur, etc. all employed for ordinary rubbers. Specific examples of the usable crosslinking agent are those crosslinking agents, crosslinking coagents, crosslinking accelerators, etc. described in, for example, "Crosslinking Agent Handbook" (written by Shinzo Yamashita and Tosuke Kaneko and published by Taiseisha).

The amount of the crosslinking agent used can be appropriately varied depending upon the properties required for the final composition to be obtained. However, when a sulfur vulcanizing agent or a resin crosslinking agent is used, there are usually used 0.1–8 parts by weight of a crosslinking agent, 0.1–10 parts by weight of a vulcanization accelerator, 0.5–10 parts by weight of an accelerator activator, 0.5–10 parts by weight of an active agent and 0.1–10 parts by weight of a crosslinking coagent per 100 parts by weight of the rubber component in the composition. Exact amounts are appropriately determined depending upon the composition to be obtained.

When an organic peroxide is used as the crosslinking agent, it is preferable to add the organic peroxide in such an amount that the calculated active oxygen amount in the organic peroxide added becomes 0.0001–0.3 mole per 100 parts by weight of the rubber component in the composition. When the amount is less than 0.0001 mole, no sufficient crosslinking takes place. When the organic peroxide is added in an amount larger than 0.3 mole, no further crosslinking can be expected; the addition in such an amount is uneconomical; and undesirable side reactions such as polymer decomposition and the like tend to occur.

The dynamic crosslinking can be achieved by kneading the above-mentioned components using an extruder, a Banburymixer, a kneader or their appropriate combination. In view of the productivity, it is most preferable to knead the components continuously using a twin-screw extruder, and in this case, a plasticizer and a crosslinking agent are added in the middle of the extruder.

Hence, the extruder is desirably a long shaft type having a L/D of 30 or more. With respect to the addition sequence of the individual components, there is a case in which the components (A) and (B) and a crosslinking agent are added simultaneously, and a case in which the components (A) and (B) are kneaded first and a crosslinking agent is added during the kneading. The latter case is preferable.

In the composition of the present invention, the rubber component (B) is preferably dispersed in the thermoplastic polyester elastomer component (A). The average particle diameter of the rubber component (B) is preferably 50 μm or less, more preferably 10 μm or less, most preferably 5–0.01 μm. When the dispersed particles of the rubber component (B) have large particle diameters, no satisfactory physical properties are obtainable.

In the present invention, the average particle diameter of the rubber particles is an average of the values obtained by measuring the particle diameters of at least 100 rubber particles in a random visual field observed through an electron microscope. In the case of non-spherical particles, their diameters are taken as those of circles having the same cross-sectional areas.

In order to sufficiently disperse the rubber component (B) in the polyester elastomer component (A) and further strengthen the interface to enhance the physical properties of the composition, a so-called compatibilizer can be used. The compatibilizer can be largely classfied into a type giving rise to no chemical reaction and a type giving rise to a chemical reaction. The former is usually a block copolymer or a graft copolymer and has an emulsifying action. The latter is, for example, a polymer having a functional group at the terminal or in the side chain, or a high-molecular macromer having a polymerizable group at the terminal of the polymer.

Specific examples of the compatibilizer include ethylene/glycidyl methacrylate copolymer-polymethyl methacrylate graft polymer, ethylene/glycidyl methacrylate copolymer-acrylonitrile/styrene copolymer graft polymer, ethylene/glycidyl methacrylate copolymer-polystyrene graft polymer, ethylene/ethyl acrylate copolymer-polymethyl methacrylate graft polymer, ethylene/ethyl acrylate copolymer-polyacrylonitrile graft polymer, ethylene/ethyl acrylate copolymer-polystyrene graft polymer, ethylene/vinyl acetate copolymer-polymethyl methacrylate graft polymer, ethylene/vinyl acetate copolymer-polyaclrylonitrile graft polymer, ethylene/vinyl acetate copolymer-polystyrene graft polymer, polypropylene-polyacrylonitrile graft polymer, polypropylene-polystyrene graft polymer, polypropylene-polystyrene graft polymer, polyethylene-polymethyl methacrylate graft polymer, polyethylene-polyacrylonitrile graft polymer, polyethylene-polystyrene graft polymer, epoxy-modified polystyrene-polymethyl methacrylate graft polymer, polybutylene terephthalate-polystyrene graft polymer, acid-modified acrylate-polymethyl methacryalte graft polymers, acid-modified acrylate-polystyrene graft polymers, polystyrene-polymethyl methacrylate graft polymer, polystyrene-polyethylene graft polymer, polystyrene-polybutadiene graft polymer, polystyrene-polyacrylonitrile block copolymer, polystyrene-polybutyl acrylate block copolymer, etc.

Typical exmaples of the commercial products of the compatibilizer are MODIPER A 1100, A 3100, A 4100, A 5100, A 6100, A 1200, A 4200, A 5200, A 6200, A 1400, A 3400, A 4400, A 5400 and A 6400 of Nippon Oils and Fats Co., Ltd.; RESEDA® GP 100, GP 200, GP 300, GP 400, GP 500 and GP 700 of Toa Gosei Chemical Industry Co., Ltd.; and the like.

Examples of the compatibilizer including the above are described in, for example, an article by Saburo Akiyama in the journal "Hyomen" published by Hymen Danwakai 1991, Vol. 29, No. 1, or an article by Yoshiharu Maeda, et al. in the journal "Polymer Applications" 1991, Vol. 40, No. 4.

Among these compatibilizers, preferred ones differ depending upon the type of the rubber component (B) used. However, particularly preferred are those having an epoxy group or carboxyl group which can react directly with the thermoplastic polyester elastomer component (A).

The composition of the present invention has the following distribution of proton spin relaxation time (referred to hereinafter as $T_2$) measured at room temperature by pulsed NMR method.

In the present invention, when $T_2$ is divided into three regions, i.e. a long-time region (referred to hereinafter as $T_{2l}$) of 100–500 μsec, a medium-time region (referred to hereinafter as $T_{2m}$) of 20 μsec or more and less than 100 μsec and a short-time region (referred to hereinafter as $T_{2s}$) of 0 μsec or more and less than 20 μsec, $T_{2l}$, $T_{2m}$ and $T_{2s}$ are 55–85%, 5–20% and 10–40%, respectively, based on the signal intensities obtained.

When $T_{2l}$ is less than 55%, when $T_{2m}$ exceeds 20%, or when $T_{2s}$ exceeds 40%, the composition has poor flexibility and compression set. When $T_{2m}$ is less than 5% or when $T_{2s}$ is less than 10%, the composition has poor mechanical strengths.

In measuring $T_2$ by pulsed NMR method, various methods can be used, though a solid echo method is preferably used because it enables precise measurement of $T_2$ for nonuniform solids.

The proportions of $T_{2l}$, $T_{2m}$ and $T_{2s}$ can be obtained by applying the measured signals (FID) to the following approximate equation to calculate signal intensities at $T_{2l}$, $T_{2m}$ and $T_{2s}$ and calculating the proportions of $T_{2l}$, $T_{2m}$ and $T_{2s}$ from the signal intensities:

$$M(t) = M_l \exp\left(-\frac{t}{T_{2l}}\right) + M_m \exp\left(-\frac{1}{2}\left(\frac{t}{T_{2m}}\right)^2\right) + M_s \exp\left(-\frac{1}{2}\left(\frac{t}{T_{2s}}\right)\right)$$

$M(t)$=signal intensity at t μsec $M_l$=signal intensity at $T_2$ $M_m$=signal intensity at $T_{2m}$ $M_s$=signal intensity at $T_{2s}$ Proportion of $T_{2l}$=[$M_l/(M_l+M_m+M_s)$]×100 (%)

Proportion of $T_{2m}$=[$M_m/(M_l+M_m+M_s)$]×100 (%)

Proportion of $T_{2s}$=[$M_s/(M_l+M_m+M_s)$]×100 (%)

The measurement method and the analysis method are described in detail in, for example, the "Magnetic Resonance of Polymers" section of "Polymer Experimentation 18" edited by the compilation committee of The Society of Polymer Science, Japan and published in 1975 by Kyoritsu Shuppan Co., Ltd.

The $T_2$ obtained as above differs depending upon the types of the polyester and rubber used as starting materials. When the proportion of the $T_{2l}$ of the dynamically crosslinked composition to the $T_{2l}$ of the uncrosslinked composition produced using the same starting materials in the same proportions is 99% or less, preferably 98–87%, more preferably 97–90%, an improved composition can be obtained, and when said $T_2$ is more than 99%, the mechanical properties and compression set become inferior.

The bending modulus of the present composition at room temperature as measured in accordance with ASTM D 790, is usually 700 kgf/cm² or less, preferably 700–100 kgf/cm², more preferably 600–100 kgf/cm². When the bending modulus is more than 700 kgf/cm², the composition has poor flexibility.

A plasticizer can be added to the composition of the present invention for further improvement in flexibility and fluidity, in such an amount that the mechanical strengths, etc. of the composition are not impaired.

The usable plasticizer includes mineral oil type rubber softeners called process oils or extending oils; phthalic acid esters such as dioctyl phthalate, dibutyl phthalate, diethyl phthalate, butyl benzyl phthalate, di-2-ethylhexyl phthalate, diisodecyl phthalate, diundecyl phthalate, diisononyl phthalate and the like; phosphoric acid esters such as tricresyl phosphate, triethyl phosphate, tributyl phosphate, tri-2-ethylhexyl phospahte, trimethyl phosphate, tributoxyethyl phosphate, tris-chloroethyl phosphate, tris-dichloropropyl phosphate, condensed phosphate, triphenyl phosphate, trixylenyl phosphate, cresyl diphenyl phosphate, xylenyl diphenyl phosphate, 2-ethylhexyl diphenyl phosphate, trilauryl phosphate, tricetyl phosphate, tristearyl phosphate, trioleyl phosphate and the like; trimellitic acid esters such as octyl trimellitate, isononyl trimellitate, isodecyl trimellitate and the like; dipentaerythritol esters; fatty acid esters such as dioctyl adipate, dimethyl adipate, di-2-ethylhexyl adipate, diisobutyl adipate, dibutyl adipate, diisodecyl adipate, dibutyl diglycol adipate, di-2-ethylhexyl azelate, dioctyl azelate, dioctyl sebacate, di-2-ethylhexyl sebacate, methyl acetylricinoleate and the like; pyrometllitic acid esters such as octyl pyromellitate and the like; epoxidized plasticizers such as epoxidized soybean oil, epoxidized linseed oil, epoxidized alkyl alcohol-fatty acid ester (e.g. epoxidized octyl alcohol-fatty acid ester) and the like; polyether plasticizers such as adipic acid ether ester, polyether ester, polyether and the like; and so forth. These plasticizers can be used alone or in combination of two or more.

In using the above plasticizers in the present composition, phthalic acid esters, phosphoric acid esters, epoxy type plasticizers, polyether type plasticizers, etc. are preferred in view of the bleeding. Phthalic acid esters and polyether type plasticizers are particularly preferred.

The addition of the plasticizer may be either before or after the addition of the crosslinking agent. It is also possible to add part of the plasticizer before crosslinking and add the rest after crosslinking.

Further, a liquid rubber such as liquid acrylonitrile-butadiene copolymer rubber, liquid acrylic rubber, liquid polybutadiene rubber of the like can be added to the present composition for further improvement in fluidity and flexibility, in such an amount that the mechanical strengths of the composition are not impaired.

To the composition of the present invention can be added a filler (e.g. calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, carbon black, carbon fiber and the like) and a coloring agent (e.g. carbon black, ultramarine, titanium oxide, zinc white, red iron oxide, Prussian blue, azo pigment, nitron pigment, color lake, phthalocyanine pigment and the like), in such amounts that the fluidity and mechanical strengths of the composition are not impaired.

To the composition of the present invention can further be added various stabilizers such as antioxidant, light stabilizer, ultraviolet absorber and the like, in combination of two or more.

Specific exmaples of the antioxidant include amine type antioxidants such as phenyl-α-naphthylamine (PAN), octyldiphenylamine, N,N'-diphenyl-p-phenylenediamine (DPPD), N,N'-di-β-naphthyl-p-phenylenediamine (DNPD), N-(1,3-dimethylbutyl)-N'-phenyl-p-phenylenediamine, N-phenyl-N'-isopropyl-p-phenylenediamine (IPPD), N,N'-diallyl-p-phenylenediamine, phenothiazine derivatives, diallyl-p-phenylenediamine mixture, alkylated phenylenediamines, 4,4'-(α,α-dimethylbenzyl)diphenylamine, p,p-toluenesulfonylaminodiphenylamine, N-phenyl-N'-(3-methacryloyloxy-2-hydropropyl)-p-phenylenediamine, diallylphenylenediamine mixture, diallyl-p-phenylenediamine mixture, N-(1-methylheptyl)-N'-phenyl-p-phenylenediamine, diphenylamine derivatives and the like; imidazole type antioxidants such as 2-mercaptobenzoimidazole (MBI), zinc salt of 2-mercaptobenzothiazole (ZnMBI), zinc salt of 2-mercaptomethylbenzoimidazole, tributylthiourea, 2-mercaptomethylbenzoimidazole, 1,3-bis(dimethylaminopropyl)-2-thiourea and the like; phenol type antioxidants such as 2,5-di-tert-amylhydroquinone (DAHQ), 2,5-di-tert-butylhydroquinone (DBHQ), 4,4'-hydroxydiphenylcyclohexane, 2,2'-methylenebis-(4-methyl-6-tert-butylphenol) (MBMTB), 2,6-di-tert-butyl-4-methylphenol, 4,4'-thiobis(6-tert-butyl-3-methylphenol), styrenated phenol, 2,2'-methylene-bis-(4-ethyl-6-tert-butylphenol), 2,6-di-tert-butyl-4-ethylphenol, bis(3,5-di-tert-butyl-4-hydroxybenzyl) sulfide, phenol derivatives, bisphenol derivatives and the like; a reaction product between acetone and diphenylamide; a reaction product between diphenylamine, aniline and acetone; 2,2,4-trimethyl-1,2-dihydroquinoline polymer (TMDQ); 6-ethoxy-2,2,4-trimethyl-1,2-dihydroquinoline (ETMDQ); a reaction product between amine and ketone; dilaruryl thiopropionate; dithiocarbamate type antioxidants such as nickel dibutyldithiocarbamate (NiDBC), nickel diethyldithiocarbamate, nickel dimethyldithiocarbamate and the like; phosphate type anitioxidants such as tri(nonylphenyl)phosphate and the like; and secondary antioxidants such as tri(nonylphenyl) phosphite, triphenyl phosphite, diphenyl isodecyl phosphite, trioctadecyl phosphite, tridecyl phosphite, thiodipropionic acid, dilauryl thiodiproipionate, distearyl thiodipropionate, dimyristyl thiodipropionate, distearyl β,β-thiodibutyrate and the like.

Specific examples of the light stabilizer and the ultraviolet absorber include 4-tert-butylphenyl salicylate, 2,4-dihydroxybenzophenone, 2,2'-dihydroxy-4-methoxybenzophenone, ethyl-2-cyano-3,3'-diphenyl acrylate, 2-ethylhexyl-2-cyano-3,3'-diphenyl acrylate, 2-(2'-hydroxy-3'-tert-butyl-5'-methylphenyl)-5-chlorobenzotriazole, 2-(2'-hydroxy-3,5'-di-tert-butylphenyl)benzotriazole, 2-(2'-hydroxy-5'-methylphenyl)benzotriazole, 2-hydroxy-5-chlorobenzophenone, 2-hydroxy-4-methoxybenzophenone, 2-hydroxy-4-octoxybenzophenone, 2-(2'-hydroxy-4-octoxyphenyl)benzotriazole, monoglycol salicylate, oxalic acid amide, phenyl salicylate, 2,2',4,4'-tetrahydroxybenzophenone, etc.

Further, the thermoplastic polyester elastomer composition of the present invention can be blended as necessary with resins such as polypropylene, polyvinyl chloride, polycarbonate, PET, PBT, polyacetal, polyamide, epoxy resin, polyvinylidene fluoride, polysulfone, ethylene-vinyl acetate copolymer, PPS resin, polyetheretherketone, PPO resin, styrene-methyl methacrylate copolymer, styrene-maleic anhydride copolymer, rubber-modified PPO resin, styrene-maleimide copolymer, rubber-modified styrene-maleimide copolymer and the like.

The hardness of the thermoplastic polyester elastomer composition of the present invention is preferably 60–95 points (JIS A hardness), more preferably 70–95 points, particularly preferably 80–95 points. When the hardness is unnecessarily low, the resistance to rotational expansion becomes insufficient, whereby the bellows portion of boot is expanded by a centrifugal force during the high-speed rotation, and further the resistance to negative pressure becomes insufficient, whereby the bellows portion of boot is caved in when the boot inside pressure is reduced owing to the lowering of temperature. When the hardness of the composition is higher than required, the object of the present invention cannot be achieved.

The thermoplastic polyester elastomer composition of the present invention may be formed into a constant velocity joint boot by blow molding, injection blow molding or the like; however, in order to obtain a boot of uniform film thickness, injection molding is preferably used. In producing a boot by injection molding, the composition has preferably an MFR (a fluidity as measured at 230° C. under a load of 10 kg) of 0.1 g/10 min or more, preferably 5 to 100 g/10 min, more preferably 10–100 g/10 min.

The constant velocity joint boot produced from the thermoplastic polyester elastomer composition of the present invention excels not only in basic properties such as strength, compression set, heat resistance, weather resistance, cold resistance, grease resistance and the like, but also in practical properties such as fatigue resistance, abrasion resistance and the like, and moreover is very flexible. The composition of the present invention is a new material for synchronous joint boot, having no drawbacks as possessed by conventional materials such as chloroprene rubber and mere thermoplastic polyester elastomer.

The composition of the present invention can be used as elemental materials for automobile parts (e.g. bumper part, side shield, steering wheel, joint boot, molding, handle); footwear (e.g. shoe sole, sandal); electrical parts (e.g. cap, plug); sports and leisure goods (e.g. golf club grip, baseball bat grip, swimming fin, water glass, steering boots, Macpherson struct boots, towlink boots, ball joint seal, tie rod seal, universal joint seal, bellows for air suspension, rolling diaphragm, propeller shaft boots); rubber contacts (e.g. keyboard switch); curl cords; couplings; O-rings; gaskets; waterproof cloth; tubes and hoses (e.g. hydraulic hose, power steering hose, vacuum tube, coil tube, garden hose); packing roll; belts; etc.

The present invention is described in more detail by way of Examples. However, the present invention is by no means restricted to these Examples.

EXAMPLE 1

Using a twin-screw extruder, there were kneaded, at 210° C. at 200 rpm, a thermoplastic polyester elastomer (PIPI-FLEX, a polyetherester elastomer produced by Enichem Polymeri Co., Ltd.) and an acrylonitrile-butadiene rubber (referred to hereinafter as NBR) [bound acrylonitrile content=41% by weight, Mooney viscosity $(ML_{1+4} 100° C.)=56$, SP value=10.0) in the proportions shown in Table 1. In the middle of kneading, 0.4 part by weight of Kayahexa AD (a product of KAYAKU AKZO CORPORATION was added, as a crosslinking agent, per 100 parts by weight of the total of the above two components, and dynamic crosslinking was conducted. Then, 1% by weight of NOCRAC NBC (a product of Ohuchi Shinko Chemical Industrial Co., Ltd.) and 0.2% by weight of IRGANOX 1010 [a product of Ciba-Geigy (Japan) Limited] were added as antioxidants to obtain a composition having the properties shown in Table 1.

The properties were measured as follows.
Measurement of proton spin relaxation time A composition in the pellet form was measured for $T_2$ at 25° C. using CPX-90 NMR (a product of BRUKER JAPAN CO., LTD., $^1H$ nucleus 90 MHz) in accordance with the solid echo method.
MFR
Measured at 230° C. under a load of 10 kg.

EXAMPLES 2–9

Compositions having properties shown in Table 1 were obtained by repeating the same procedure as in Example 1, except that the rubbers shown in Table 1 were used in place of the acrylonitrile-butadiene rubber and, in Example 7, 0.8 part by weight of ammonium benzoate and 0.4 part by weight of stearic acid were used in place of the 0.4 part by weight of Kayahexa.

The rubbers shown in Table 1 and used in these Examples were as follows:

Example 2 Hydrogenated NBR (THERBAN 1907, a product of Bayer Japan, Ltd.)

Example 3 Hydrogenated acrylic acid ester-butadiene copolymer rubber (the production process is shown later.)

Example 4 Ethylene-propylene copolymer rubber (JSR EP EP02P, a product of Japan Synthetic Rubber Co., Ltd.)

Example 5 Epoxy-modified NBR (the production process is shown later.)

Example 6 Silicone rubber (JSR EH5230U, a product of Japan Synthetic Rubber Co., Ltd.)

Example 7 Acrylic rubber (NOXTITE PA302, a product of Nippon Mektron, Ltd.)

Example 8 Epichlorohydrin rubber (EPICHLOMER HG, a product of DAISO CO., LTD.)

Process for the production of hydrogenated acrylic acid ester-butadiene copolymer rubber To a nitrogen-purged iron container were fed 50 parts of methyl acrylate, 50 parts of 1,3-butadiene, 200 parts of water, 3 parts of sodium lauryl sulfate, 0.2 part of p-menthane hydroperoxide, 0.125 part of sodium ethylenediaminetetraacetate, 0.05 part of ferrous sulfate, 0.2 part of sodium formaldehyde sulfoxylate and 0.2 part of tert-dodecylmercaptan. Then, polymerization was conducted at 10° C. for 1–10 hours.

After the polymerization, the reaction product was taken out and steam was blown thereinto to remove unreacted monomers. The resulting copolymer rubber latex was mixed with an aqueous calcium chloride solution to coagulate the latex. The coagula were thoroughly washed with water and dried at about 90° C. for 1–3 hours to obtain a copolymer rubber.

In 90 parts of toluene was dissolved 10 parts of the copolymer rubber. The solution was placed in a pressure container. Then, the carbon-carbon double bonds of polymerized conjugated diene units in the copolymer rubber were hydrogenated at a hydrogen pressure of 40 kg/cm$^2$G using, as a catalyst, 0.5 part of nickel naphthenate and 0.15 part of triethylaluminum, at 60° C. for 1–5 hours, to obtain a hydrogenated copolymer rubber.

The hydrogenated copolymer rubber had a polystyrene-reduced weight-average molecular weight of 1,230,000 and a hydrogenation degree of 96%.

Process for the production of epoxy-modified NBR

An acrylonitrile-butadiene rubber having a bound acrylontrile content of 41% and a Mooney viscosity (ML$_{1+4}$100° C.) of 56 was ground. The ground rubber was kneaded using a twin-screw extruder of 70° C. while in the middle of kneading, 0.05 part by weight, per 100 parts by weight of the rubber, of 2,5-dimethyl-2,5-di-tert-butylperoxyhexane and 0.2 part by weight, per 100 aprts by weight of the rubber, of glycidyl methacrylate were added, to prepare an epoxy-modified NBR.

The compatibilizer used in Example 9 is MODIPER 4400 (a product of Nippon Oils and Fats Co., Ltd.).

COMPARATIVE EXAMPLE 1

A composition was produced by repeating the same procedure as in Example 1, except that no crosslinking agent was added. The properties of the composition are shown in Table 2. As is clear from Table 2, no crosslinking results in poor mechanical strengths and compression set.

COMPARATIVE EXAMPLE 2

A composition was produced by repeating the same procedure as in Example 3, except that no crosslinking agent was added. The composition, similarly to that of Comparative Example 1, has poor mechanical strengths and compression set.

COMPARATIVE EXAMPLE 3

A crosslinking agent was added to the composition obtained in Comparative Example 1, on rubber rolls at 70° C. The roll operability was very poor, and it was impossible to thoroghly disperse the crosslinking agent in the composition. The mixture was allowed to stand at 150° C. for 10 minutes for crosslinking, after which it was cut into pellets. The pellets were injection-molded to obtain a sheet. The sheet had, on the surface, small lumps which seemed to be a gel. The proportion of T$_{2l}$ component obtained by pulse method NMR was 99.5% relative to that of unvulcanized component, which indicates insufficient crosslinking. The sheet was poor also in mechanical properties and compression set.

COMPARATIVE EXAMPLE 4

A composition was obtained by repeating the same procedure as in Example 1 according to the recipe shown in Table 2. This Comparative Example is a case using the rubber in an amount smaller than that specified in the present invention, and the composition had poor flexibility and compression set.

COMPARATIVE EXAMPLE 5

A composition was obtained by repeating the same procedure as in Example 1 according to the recipe shown in Table 2. This Comparative Example is a case using the rubber in an amount larger than that specified in the present invention. No strand could be obtained during the production by extruder and it was difficult to obtain a product. The composition had substantially no fluidity and was unable to be injection molded.

COMPARATIVE EXAMPLE 6

A composition having the properties shown in Table 2 was obtained by repeating the same procedure as in Example 1, except that the amount of the crosslinking agent used was changed to that shown in Table 2. This is a case in which the fluidity and the component proportion as measured by pulse method NMR deviated from those specified in the present invention, and injection molding was impossible.

COMPARATIVE EXAMPLE 7

Kneading was conducted for the composition shown in Table 2 at 195° C. for 30 seconds using a 3-liter kneader. A crosslinking agent was added and kneading was conducted for a further 30 seconds to obtain a sample. The sample was ground and injection-molded. In the resulting composition, the average rubber particle diameter was as large as 60 μm owing to insufficient kneading and the mechanical properties were poor. The moldability was also poor.

COMPARATIVE EXAMPLE 8

A composition having the properties shown in Table 2 was obtained by repeating the same procedure as in Example 1, except that the amount of the crosslinking agent used was smaller. This is a case in which the proportion of T$_{2l}$ component as measured by pulse method NMR exceeded 99% relative to that of uncrosslinked component, and the composition had poor mechanical properties and compression set.

Test Example I

The compositions obtained in Examples 1–9 and Comparative Examples 1–8 were formed into respective pellets, and the pellets were molded into sheets each of 2 mm in thickness at 210° C. using an injection molding machine. The sheets were evaluated for the following items according to the following test methods. The results are shown in Table 1 and Table 2.

(1) Hardness

Measured by JIS K 6301 (JIS A hardness).

(2) Tensile strength

Measured by JIS K 6301 (JIS No. 3 dumbbell).

(3) Tensile elongation

Measured by JIS K 6301 (JIS No. 3 dumbbell).

(4) Compression set

Measured by JIS K 6301 (120° C., 22 hours).

(5) Thermal aging resistance (JIS K 6301)

A sample was exposed to 120° C. for 300 hours in a Geer oven, after which the tensile strnegth was measured. The thermal aging resistance of the sample was expressed by a change (%) of the tensile strength relative to that before thermal aging.

(6) Oil resistance (JIS K 6301)

A sample was immersed in a JIS No. 3 oil at 120° C. for 70 hours, after which the tensile strength was measured. The oil reisstance of the sample was expressed as a change (%) of the tensile strength relative to that before immersion.

(7) Appearance of molded product

Expressed as "good" when no short shot occurred and the appearance of the molded product was not remarkably bad in respect of flow mark and delamination.

Test Example II

The compositions obtained in Examples 1–9 and Comparative Examples 1–8 were injection-molded using a boot mold to produce respective joint boots of 1 mm in film thickness. There were also produced in the same manner a joint boot consisting of a thermoplastic polyester elastomer alone, in Comparative Exmaple 9 and a joint boot consisting of a chloroprene rubber alone, in Comparative Example 10. These joint boots were evaluated for the following items according to the following test methods. The results are shown in Table 3.

(1) Hardness and appearance of molded product

Measured in the same manner as in Test Example I.

(2) Boot life

A boot obtained by injection molding was fitted to a synchronous joint, after which a grease was sealed thereinto. The resulting joint was rotated at 400 rpm in an atmosphere of −5° C. with a joint angle kept at 30° C., and there was examined a time until the boot was broken owing to the wear. When the sample was not broken even after 50 hours, the test was terminated and the boot life was reported as 50 hours.

TABLE 1

|  | Example | | | | | | | | |
|---|---|---|---|---|---|---|---|---|---|
|  | 1 | 2 | 3 | 4 | 5 | 6 | 7 | 8 | 9 |
| Composition (parts) | | | | | | | | | |
| Polyester elastomer | 60 | 60 | 60 | 60 | 60 | 60 | 60 | 60 | 57 |
| NBR | 40 | | | | | | | | |
| Hydrogenated NBR*1 | | 40 | | | | | | | |
| B-1 | | | 40 | | | | | | |
| EPM*2 | | | | 40 | | | | | |
| B-2 | | | | | 40 | | | | |
| Silicone rubber*3 | | | | | | 40 | | | |
| ACM*4 | | | | | | | 40 | | |
| Epichlorohydrin rubber*5 | | | | | | | | 40 | |
| Compatibilizer | | | | | | | | | 3 |
| Kayahexa AD | 0.4 | 0.5 | 0.4 | 0.5 | 0.4 | 0.4 | 1.2* | 2.0** | 0.4 |
| Pulsed NMR | | | | | | | | | |
| $T_{2l}$ (%) | 61 | 62 | 60 | 62 | 60 | 55 | 58 | 60 | 58 |
| $T_{2m}$ (%) | 14 | 15 | 15 | 14 | 15 | 18 | 15 | 15 | 15 |
| $T_{2s}$ (%) | 25 | 23 | 25 | 24 | 25 | 27 | 27 | 25 | 26 |
| $T_{2l}$ after crosslinking/$T_2$ before crosslinking (%) | 91 | 93 | 92 | 90 | 89 | 95 | 95 | 96 | 91 |
| Bending modulus (kgf/cm$^2$) | 550 | 600 | 580 | 570 | 550 | 520 | 540 | 600 | 560 |
| Average particle diameter of compnent (B) (μm) | 1.0 | 1.2 | 1.1 | 1.0 | 0.9 | 1.5 | 1.2 | 1.1 | 0.9 |
| MFR (g/10 min) | 15 | 13 | 12 | 21 | 10 | 18 | 25 | 18 | 20 |
| Hardness (JIS A) | 85 | 86 | 86 | 83 | 85 | 82 | 82 | 84 | 85 |
| Tensile strength (kgf/cm$^2$) | 168 | 172 | 165 | 158 | 175 | 120 | 135 | 140 | 170 |
| Tensile elongation (%) | 850 | 840 | 860 | 880 | 880 | 600 | 650 | 600 | 800 |
| Compression set (%) | 45 | 48 | 51 | 50 | 43 | 55 | 52 | 53 | 44 |
| Thermal aging resistance (%) | −2 | 0 | −3 | 0 | −1 | 0 | −2 | −3 | −1 |
| Oil resistance (%) | −3 | 0 | −2 | −12 | −2 | −3 | −2 | −3 | −3 |
| Appearance of molded product | Good | Good | Good | Good | Good | Good | Good | Good | Good |

Note:
*0.8 part of ammonium benzoate and 0.4 part of stearic acid.
**1.5 part of minium and 0.5 part of 2-mercaptoimidazoline.

TABLE 2

|  | Comparative Example | | | | | | | |
|---|---|---|---|---|---|---|---|---|
|  | 1 | 2 | 3 | 4 | 5 | 6 | 7 | 8 |
| Composition (parts) | | | | | | | | |
| Polyester elastomer | 60 | 60 | 60 | 97 | 30 | 60 | 50 | 60 |
| NBR | 40 | — | 40 | 3 | 70 | 40 | 50 | 40 |
| B-1 | — | 40 | — | — | — | — | — | — |
| Kayahexa AD | — | — | 0.4 | 0.03 | 0.7 | 2.0 | 0.6 | 0.02 |
| Pulsed NMR | | | | | | | | |
| $T_{2l}$ (%) | 72 | 74 | 69 | 52 | 82 | 52 | 65 | 70 |
| $T_{2m}$ (%) | 8 | 7 | 8 | 12 | 10 | 26 | 15 | 10 |

TABLE 2-continued

|  | Comparative Example | | | | | | | |
|---|---|---|---|---|---|---|---|---|
|  | 1 | 2 | 3 | 4 | 5 | 6 | 7 | 8 |
| $T_{2s}$ (%) | 20 | 19 | 23 | 36 | 8 | 22 | 20 | 30 |
| $T_{2l}$ after crosslinking/$T_{2l}$ before crosslinking (%) | 100 | 100 | 99.5 | 99.6 | 90.0 | 85.0 | 98.5 | 99.5 |
| Bending modulus (kgf/cm$^2$) | 530 | 540 | 550 | 1000 | — | — | 500 | 530 |
| Average particle diameter of component (B) (μm) | 1.5 | 1.4 | 2.0 | 1.1 | — | — | 60 | 1.6 |
| MFR (g/10 min) | 48 | 52 | 45 | 62 | 0.01 | 0.05 | 5 | 45 |
| Hardness (JIS A) | 84 | 85 | 85 | 97 | — | — | 80 | 84 |
| Tensile strength (kgf/cm$^2$) | 112 | 102 | 82 | 192 | — | — | 68 | 110 |
| Tensile elongation (%) | 550 | 480 | 380 | 950 | — | — | 150 | 550 |
| Compression set (%) | 98 | 99 | 82 | 100 | — | — | 65 | 98 |
| Thermal aging resistance (%) | −21 | −12 | −32 | −5 | — | — | −38 | −20 |
| Oil resistance (%) | −36 | −28 | −40 | −3 | — | — | −42 | −35 |
| Appearance of molded product | Good | Good | Poor | Good | — | — | Poor | Good |

TABLE 3

|  | Hardness | Appearance of molded product | Applicability | Boot life (hr) |
|---|---|---|---|---|
| Example 1 | 85 | Good | Good | 50 |
| Example 2 | 86 | " | " | 45 |
| Example 3 | 86 | " | " | 40 |
| Example 4 | 83 | " | " | 30 |
| Example 5 | 85 | " | " | 50 |
| Example 6 | 82 | " | " | 40 |
| Example 7 | 82 | " | " | 50 |
| Example 8 | 84 | " | " | 50 |
| Example 9 | 85 | " | " | 50 |
| Comparative Example 1 | 84 | Good | Good | 10 |
| Comparative Example 2 | 85 | " | " | 12 |
| Comparative Example 3 | 85 | Poor | " | 8 |
| Comparative Example 4 | 97 | Impossible to mold | | |
| Comparative Example 7 | 80 | Poor | Good | 5 |
| Comparative Example 8 | 84 | Good | Good | 11 |
| Comparative Example 9 (thermoplastic polyester elastomer alone) | 97 | Impossible to mold | | |
| Comparative Example 10 (Chloroprene rubber alone) | 62 | Poor | Good | 15 |

By compounding a polyester elastomer with a specific rubber, there can be obtained in the present invention a thermoplastic polyester elastomer composition which has improved flexibility and compression set (conventional polyester elastomers have been poor in these properties) and yet retains the mechanical strengths, oil resistance and heat resistance inherently possessed by polyester elastomers.

Since this thermoplastic polyester elastomer composition has an MFR suitable for injection molding and, unlike conventional thermoplastic polyester elastomers, is flexible, it can be injection-molded into boots of complex shape and their release from a mold is easy, making it easy to obtain a synchronous joint boot of uniform film thickness.

Further, in fitting the boot to a synchronous joint, the operation is very easy owing to the flexibility of the boot and moreover, owing to the small compression set of the boot, there can be used a tightening band of simple structure as used for rubber boots. Thus, the boot produced from the present composition gives significantly improved productivity as compared with the boots produced from conventional polyester elastomers.

Furthermore, the synchronous joint boot produced from the present composition has excellent durability and promises long-term use in automobiles.

What is claimed is:

1. A thermoplastic elastomer composition obtained by dynamically crosslinking (A) 55–85% by weight of a thermoplastic polyester elastomer and (B) 45–15% by weight of at least one rubber during kneading, wherein said at least one rubber is selected from the group consising of halogen-free diene rubbers and hydrogenation products thereof, epichlorohydrin rubbers, silicone rubbers, and olefin rubbers selected from ethylene-propylene copolymer rubber and ethylene-propylene-diene terpolymer rubber, and wherein said thermoplastic elastomer composition has a melt flow rate of 10–100 g/10 minutes as measured at 230° C. under a load of 10 kg.

2. The composition according to claim 1, wherein the thermoplastic polyester elastomer (A) is a polyester block copolymer consisting of a high-melting crystalline segment (A-1) composed of an aromatic polyester unit and a low-melting polymer segment (A-2) composed of an aliphatic polyether unit, an aliphatic polyester unit or both of them.

3. A composition according to claim 1, wherein the thermoplastic polyester elastomer (A) has a melting point of 150° C. or more.

4. The composition according to claim 1, wherein the rubber (B) is at least one rubber selected from the group consisting of halogen-free diene rubbers, hydrogenation products of halogen-free diene rubbers, epichlorohydrin rubbers and silicone rubbers.

5. The composition according to claim 1, wherein the rubber (B) is at least one rubber selected from the group consisting of halogen-free diene rubbers, hydrogenation products of halogen-free diene rubbers and epichlorohydrin rubbers.

6. The composition according to claim 1, wherein the rubber (B) is at least one rubber selected from the group consisting an acrylonitrile-butadiene copolymer rubber, a hydrogenated acrylonitrile-butadiene copolymer rubber, a hydrogenated acrylic acid ester-butadiene copolymer rubber, an epichlorohydrin rubber and an ethylene-propylene copolymer rubber.

7. The composition according to claim 1, wherein the rubber (B) has a functional group or groups.

8. The composition according to claim 1, wherein the gel content of the rubber (B) after crosslinking is 50% by weight or more based on the rubber component.

9. The composition according to claim 1, wherein the region giving a proton spin relaxation time at room temperature as measured by pulse method NMR, of 100–500 μsec is 55% or more, the region giving said time of 20 μsec to less than 100 μsec is 5–20% and the region giving said time of less than 20 μsec is 10–40%.

10. The composition according to claim 9, wherein the region giving a proton spin relaxation time at room temperature as measured by pulse method NMR, of 100–500 μsec is 99% by weight or less relative to that before dynamic crosslinking.

11. The composition according to claim 1, wherein the bending modulus of the composition at 23° C. is 700 kgf/cm$^2$ or less.

12. The composition according to claim 1, wherein the rubber (B) is dispersed in the form of particles having an average particle diameter of 50 μm or less.

13. The composition according to claim 1, wherein the dynamic crosslinking is conducted during kneading in a twin-screw extruder.

14. The composition according to claim 1 wherein the rubber (B) is selected from the group consisting of halogen-free diene rubbers and hydrogenation products of halogen-free diene rubbers.

15. The composition according to claim 1, wherein the rubber (B) is selected from the group consisting of halogen-free diene rubbers.

16. The composition according to claim 1, wherein the rubber (B) is selected from the group consisting of acrylonitrile-butadiene copolymer rubber.

17. A joint boot comprising a composition as claimed in claim 1.

18. A rubber contact of keyboard comprising a composition as claimed in claim 1.

19. A thermoplastic elastomer composition obtained by dynamically crosslinking 55–85% by weight of a thermoplastic polyester elastomer and 45–15% by weight of acrylonitrile-butadiene copolymer rubber, wherein said thermoplastic elastomer composition has a melt flow rate of 10–100 g/10 minutes as measured at 230° C. under a load of 10 kg.

* * * * *